J. B. STEELE.
LAWN SPRINKLER.
APPLICATION FILED SEPT. 14, 1909.
959,270.
Patented May 24, 1910.
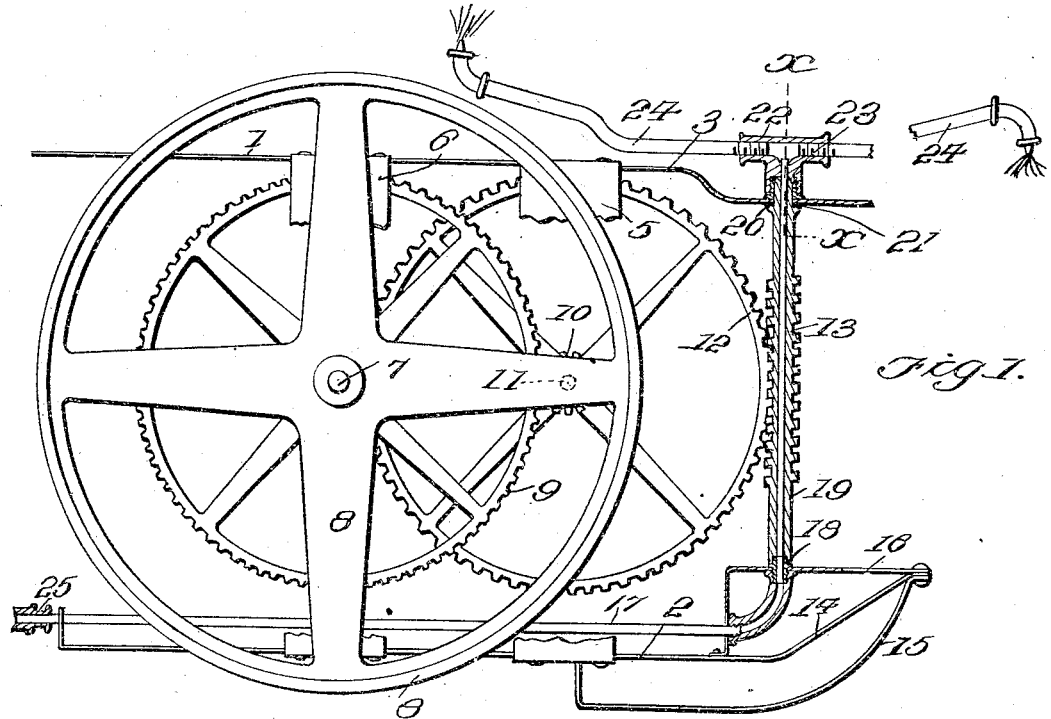
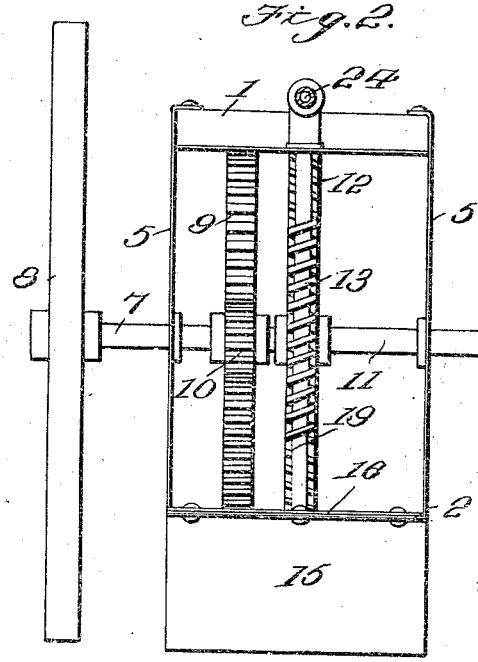
Witnesses
Inventor
J. B. Steele
By
his Attorney

UNITED STATES PATENT OFFICE.

JAMES B. STEELE, OF PENTWATER, MICHIGAN.

LAWN-SPRINKLER.

959,270.   Specification of Letters Patent.   Patented May 24, 1910.

Application filed September 14, 1909. Serial No. 517,738.

*To all whom it may concern:*

Be it known that I, JAMES B. STEELE, a citizen of the United States, residing at Pentwater, in the county of Oceana and State of Michigan, have invented certain new and useful Improvements in Lawn-Sprinklers, of which the following is a specification.

This invention relates to improvements in lawn sprinklers.

The object of the invention is to provide mechanism, operated by the flowing water, to move the sprinkler over the ground.

The invention also comprehends improvements in the specific details of construction and arrangement of parts, which will be hereinafter described and particularly pointed out in the claims.

In the drawing:—Figure 1 is a side elevation of my improved sprinkler; Fig. 2 is a front elevation of the same; and Fig. 3 is a detail enlarged section on the line $x$—$x$ of Fig. 1.

The same numerals refer to like parts in all the figures.

The numeral 1 indicates a frame composed of longitudinally disposed upper and lower sides, and vertically arranged connecting bars 5 and 6. In the bars 6 are formed bearings for a shaft 7, on which are mounted traction wheels 8, located on the outside of the frame 1. On this shaft is also mounted a gear wheel 9, which meshes with a pinion 10, mounted on a shaft 11 which has bearings in the vertical bars 5. On the shaft 11 is secured a worm gear wheel 12, which engages a worm 13.

The lower bar 2 is bent upwardly at its front end as at 14, and to the underside of the same is attached a runner 15, the bottom of which is about on a level with the bottom of the traction wheels 8. On the upper side of the lower bar 2, at the front end is a supplemental frame 16, which supports the intake pipe 17.

Extending upwardly from the end of the intake pipe 17 and above the supplemental frame 16 is a nipple 18, over which fits the lower end of a vertical pipe 19, on which is a worm 13. This pipe 19 is supported at the lower end by the nipple, and revolves on the projecting end of the same, and near its upper end it is provided with a flange 20 which bears against the underside of the upper horizontal bar 3 of the frame 1, and interposed between said flange and the frame is a washer 21. The end of the vertical pipe 19 extends beyond the frame and has secured to it a T-head 22, washers 23 being interposed between said head and the end of the vertical pipe 19 to form a packing.

Extending from the horizontal arms of the T joint are pipes 24, the ends of which may be provided with sprinklers bent in opposite directions to properly distribute the water.

In operation the intake pipe 17 is connected to the hose indicated at 25, and the force of the water passing through the arms or laterally extending pipes 24 causes the same to revolve, which in turn causes the worm 13 to revolve. The revolution of the worm imparts a rotary motion through the gearing, previously described, to the shaft 7, hence the entire apparatus moves over the lawn which is being sprinkled. At the end of the course, the attendant turns the machine around, or directs it in any other path of movement to continue the sprinkling operation. As long as the water is passing through the pipes the apparatus will continue to move.

The vertical pipe 19, is supported on the upper end of the nipple 18, the latter, and the opening in the horizontal bar 3, providing bearings to permit the said vertical pipe to freely revolve during the operation of the sprinkler.

By providing the runner 15 it assists in reducing the friction, so that the small supply of water will very readily move the apparatus.

The invention is extremely simple and durable, and by reason of the few parts is not liable to get out of order.

What I claim is:—

1. In a lawn sprinkler, the combination with a frame, a shaft, traction wheels on the shaft, a revolving sprinkler, a vertically disposed feed water pipe connected to the revolving sprinkler, having a flange and a cap which engage the opposite sides of a part of the frame to hold said vertically disposed pipe in position, a stationary coupling mounted on the frame, and on which the vertically disposed feed water pipe is mounted, a water inlet pipe connecting with the coupling, a worm on the vertically disposed feed water pipe, a counter shaft between the worm and the first mentioned shaft, a worm gear on the counter shaft which meshes with the worm, a pinion on the counter shaft, and a gear on the first mentioned shaft which engages the pinion, the action of the water passing through the sprinkler imparting motion through the gearing to the traction wheels.

2. In a lawn sprinkler, the combination, of a main frame including a runner to support the front of the frame, a shaft, wheels on the shaft to support the frame back of the runner, a supplemental frame on the main frame, a feed water inlet pipe mounted on said supplemental frame and extending above the latter to provide a bearing, a vertical pipe mounted on said bearing and provided at its upper end with a flange which seats against the under side of the main frame, a cap member secured to the upper end of the vertical pipe and overlying the main frame, the said cap member and flange retaining the vertical pipe on the bearing, a plurality of pipes extending from the cap member, a worm gear on the vertical pipe, a gear on the shaft, and gears between the gear on the shaft and the worm on the vertical pipe.

In testimony whereof I affix my signature in presence of two witnesses.

JAMES B. STEELE.

Witnesses:
F. W. FINCHER,
M. C. BEEBE.